United States Patent [19]

Herring

[11] 4,306,518

[45] Dec. 22, 1981

[54] ANIMAL FEEDER APPARATUS ESPECIALLY FOR FEEDING PIGS AND THE LIKE

[76] Inventor: William T. Herring, P.O. Box 181, Newton Grove, N.C. 28366

[21] Appl. No.: 202,613

[22] Filed: Oct. 31, 1980

[51] Int. Cl.³ ............................................. A01K 05/00
[52] U.S. Cl. .................................................. 119/53.5
[58] Field of Search .......................... 119/53.5, 54, 53

[56] References Cited

U.S. PATENT DOCUMENTS

| 1,827,075 | 10/1931 | Doane | 119/53 |
| 2,234,112 | 3/1941 | Emrick | 119/53.5 |
| 2,494,950 | 1/1950 | Lee | 119/53.5 |
| 3,552,360 | 1/1971 | Nelson | 119/53.5 |

Primary Examiner—Hugh R. Chamblee
Attorney, Agent, or Firm—Bell, Seltzer, Park & Gibson

[57] ABSTRACT

An animal feeder apparatus is provided with a separate pivotally supported gate on each side thereof which is generally vertically adjustable by adjustment means extending above the feed storage bin of the apparatus so as to be readily accessible at each side of the apparatus for varying the size of respective feed discharge openings below opposite side walls of the storage bin.

3 Claims, 6 Drawing Figures

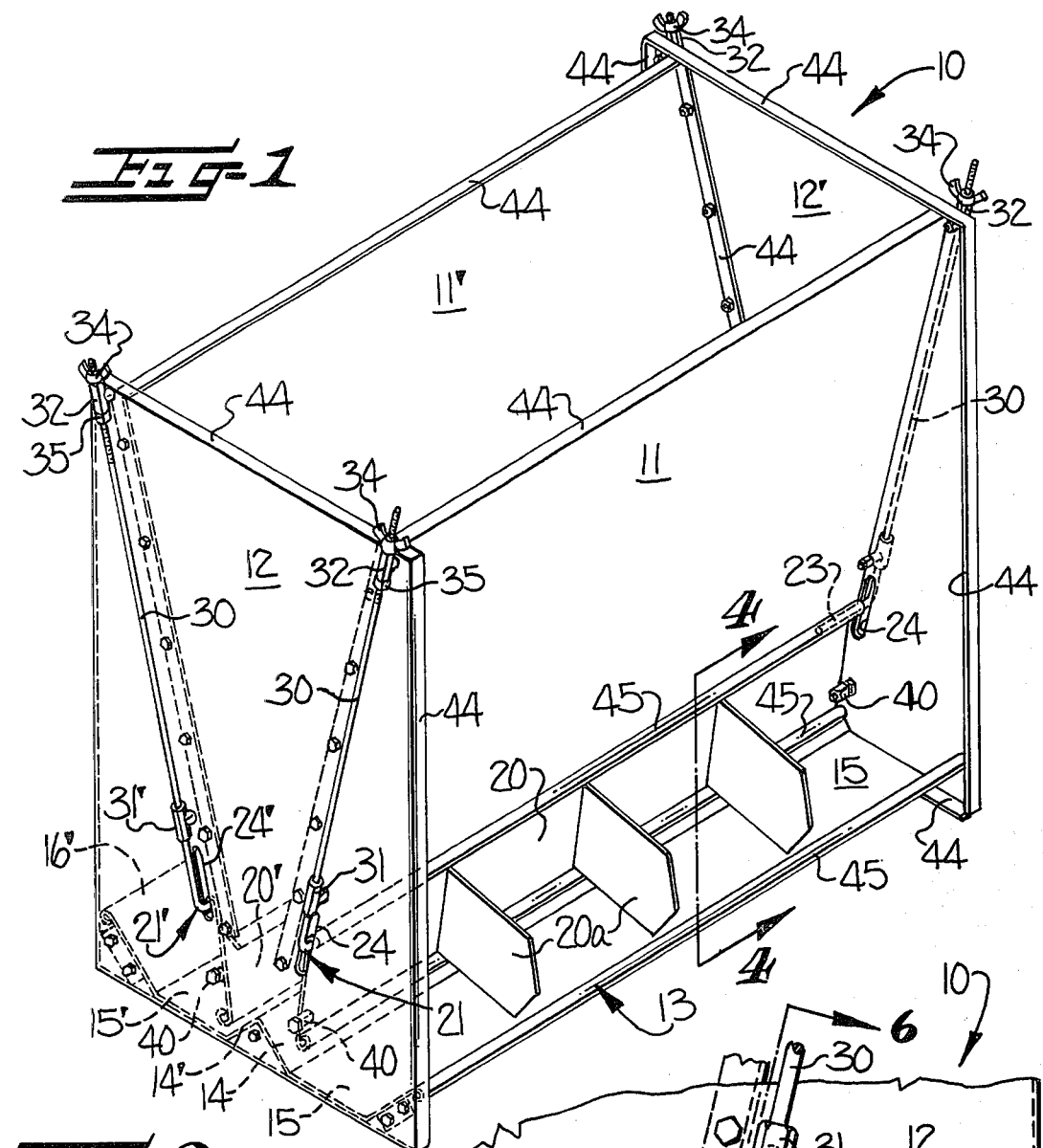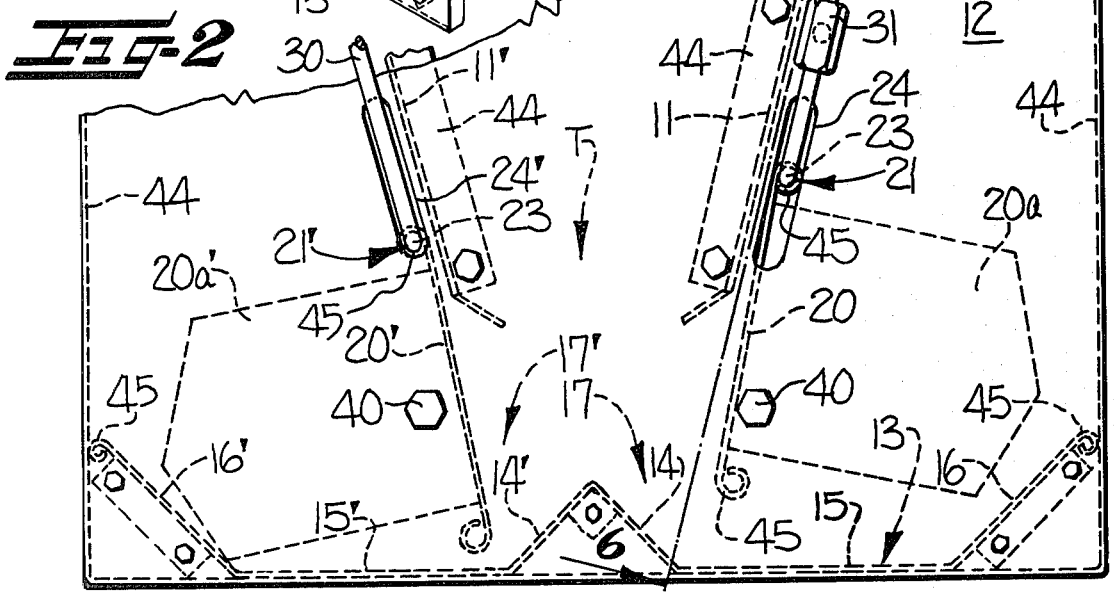

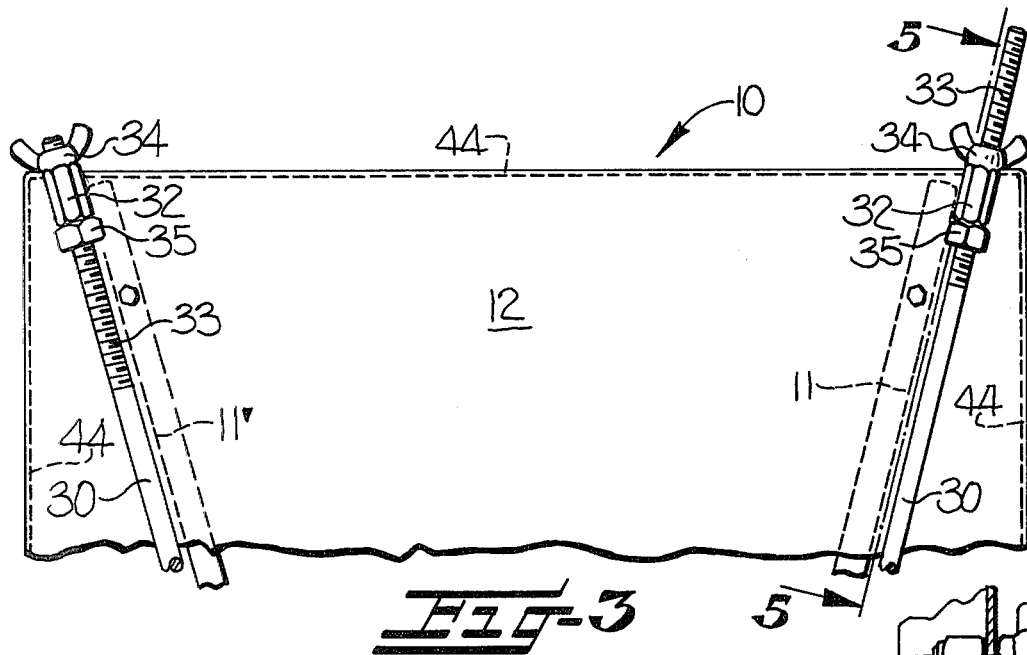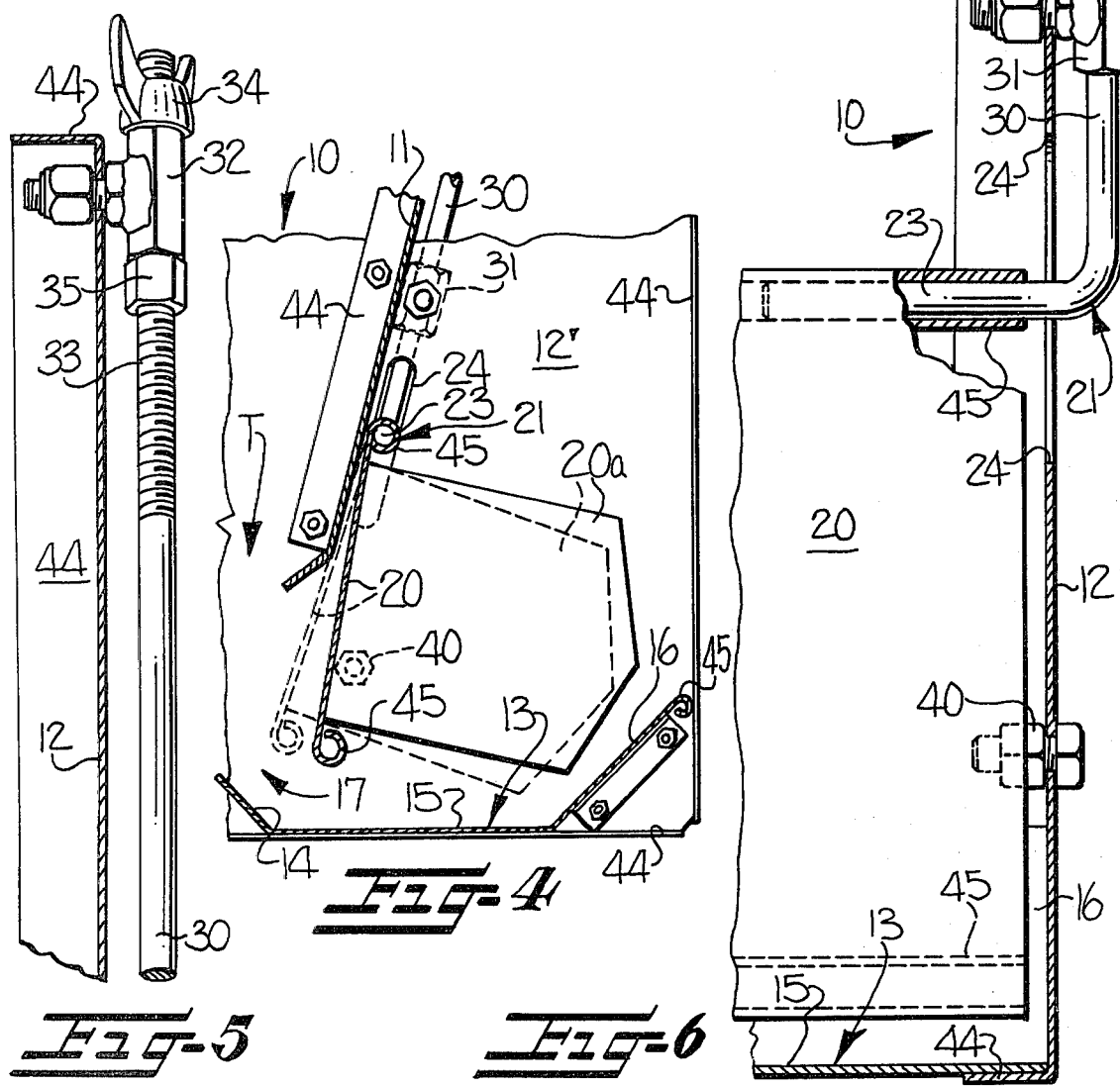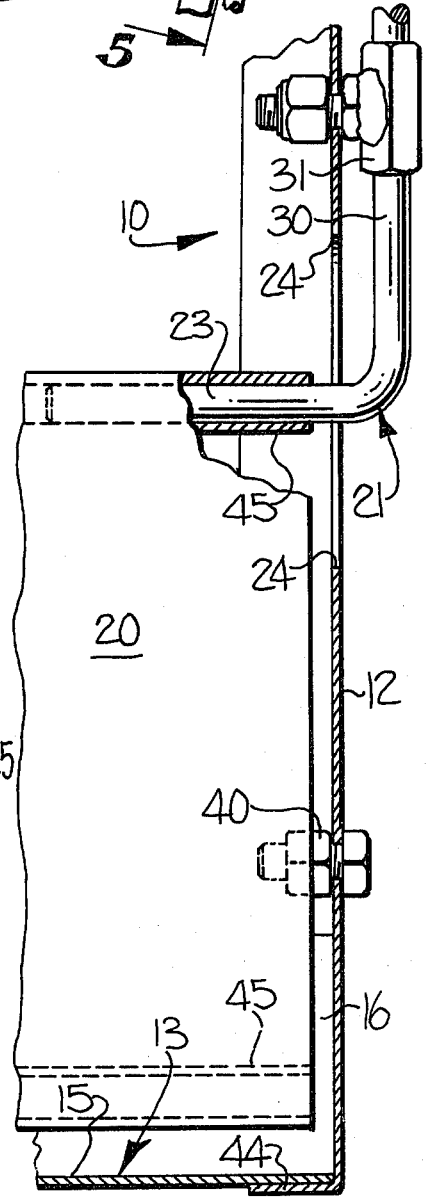

ANIMAL FEEDER APPARATUS ESPECIALLY FOR FEEDING PIGS AND THE LIKE

This invention relates to animal feeders of the type used for feeding pigs and the like.

In the feeding of pigs, oftentimes finely ground dry feed is fed through gravity feeders having a storage bin equipped with agitating apparatus and/or gates for assuring the free flow of controlled or metered quantities of feed. As far as is known, however, such known types of pig feeders have been relatively complicated construction and costly to manufacture, which are significant factors in view of the highly competitive nature of the pig feeder market.

It is therefore an object of this invention to provide an improved animal feeder apparatus of the type equipped with feed metering gates and which is highly efficient in use and of economical construction as compared to prior art pig feeders.

More particularly, it is an object of this invention to provide an animal feeder apparatus having feed discharge openings on opposite sides thereof, wherein the size of each opening is varied by means of a separate gate on each side of the feeder apparatus, and wherein adjustment means, readily accessible at each side of the feeder apparatus, is provided for adjusting the positions of the opposite ends of each gate independently of one another.

In the preferred embodiment of the feeder apparatus, each end of each gate is pivotally supported on a substantially vertically adjustable pivot shaft, and means are provided for permitting limited swinging movement of each gate about its pivot shaft irrespective of the positions of the gates between their open and closed positions so that the pigs may easily agitate the gates to aid in the flow of feed through the respective feed discharge openings, but wherein such agitation of the gates may be limited sufficiently to avoid the discharge of undesirably excessive quantities of feed through the discharge openings.

BRIEF DESCRIPTION OF THE DRAWINGS

Some of the objects and advantages of the invention having been stated, others will appear as the description proceeds when taken in connection with the accompanying drawings, in which:

FIG. 1 is a perspective view looking at the top, one end and one side of a bin-type of animal feeder embodying the present invention;

FIG. 2 is an enlarged fragmentary view looking at the left-hand end of the feeder shown in FIG. 1, and showing one of the gates thereof in a fully closed position and another gate thereof in partially opened position relative to the respective feed discharge openings of the feeder apparatus;

FIG. 3 is an enlarged fragmentary view of an upper portion of the end of the feeder apparatus shown in the left-hand portion of FIG. 1;

FIG. 4 is an enlarged fragmentary vertical sectional view taken substantially along line 4—4 in FIG. 1;

FIG. 5 is an enlarged fragmentary vertical sectional view taken substantially along line 5—5 in FIG. 3; and FIG. 6 is an enlarged fragmentary view taken substantially along line 6—6 in FIG. 2.

DETAILED DESCRIPTION

Referring more specifically to the drawings, the feeder apparatus, broadly designated at 10, comprises an open-topped bin or hopper defined by opposing downwardly converging side walls 11, 11' and opposing substantially vertically disposed end walls 12, 12'. The opposing end walls 12, 12' are of substantially rectangular shape and their upper edges are preferably positioned on substantially the same level as the upper edges of the opposing downwardly converging side walls 11, 11'. However, the lower edges of the opposing end walls 12, 12' terminate a substantial distance below the lower edges of the opposing side walls 11, 11' and are suitably secured to opposed ends of a bottom wall means which is preferably of one-piece construction and is broadly designated at 13.

The longitudinal central portion of bottom wall means 13 includes a pair of opposing downwardly sloping or diverging panel portions 14, 14', which are collectively substantially inverted V-shaped, and whose lower portions preferably terminate substantially in the vertical planes of the lower edges of the opposing downwardly converging side walls 11, 11' (see FIG. 2). The bottom wall means 13 has substantially horizontal panel portions 15, 15' extending outwardly from the lower terminal portions of the V-shaped panel portions 14, 14', and the outer end portions of the horizontal panel portions 15, 15' are connected to upwardly and outwardly inclined outer panel portions 16, 16' of the bottom wall means 13 thus forming elongate feed troughs along opposite sides of the feeder apparatus 10 and below the opposing side walls 11, 11'. The lower portions of the downwardly converging side walls 11, 11' define therebetween an escapement throat T, and since the bottom wall means 13 is spaced beneath the throat T, a feed discharge opening is defined between the lower edge of each side wall 11, 11' and the bottom wall means 13, the feed discharge openings defined by the lower edges of the respective opposing side walls 11, 11' being respectively broadly designated at 17, 17' in FIG. 2.

A pair of elongate, opposing, generally vertically movable feed metering gates 20, 20' overlie the respective feed discharge openings 17, 17' for varying the size of each opening 17, 17'. The gates 20, 20' extend longitudinally between the bin end walls 12, 12' with the opposite ends of the gates terminating closely adjacent the end walls 12, 12'. A pair of pivot means 21, 21' are positioned exteriorly of, and above the lower edges of, the respective converging side walls 11, 11' and serve to pivotally support upper opposite end portions of the respective gates 20, 20' on substantially horizontal and substantially parallel pivotal axes for inward and outward pivotal or swinging movement of the gates 20, 20' relative to the respective feed discharge openings 17, 17'.

The feed metering gates 20, 20' are provided with respective sets of longitudinally spaced, generally vertically disposed divider plates or dividers 20a, 20a' suitably secured to and extending outwardly from the gates 20, 20'. The dividers 20a, 20a' may be of substantially rectangular form with the lower edges thereof substantially spanning the distance between the bottom edges of the respective gates and those junctures of the horizontal panel portions 15, 15' with the respective outwardly inclined outer panel portions 16, 16' of bottom wall means 13. As preferred, the outer ends of the dividers 20a, 20a' are generally V-shaped so they overlie substantial portions of the width of the respective inclined outer panel portions 16, 16' of bottom wall means even when the respective gates 20, 20a are fully closed (see gate 20' in FIGS. 1 and 2).

It can be appreciated that the dividers 20a, 20a' serve to define several stall-like compartments or feeding spaces along each side of the feeder apparatus and immediately adjacent the feed troughs defined by the respective portions 14, 15, 16 and 14', 15', 16' of bottom wall means 13, and the dividers also aid in preventing the pigs from throwing the feed sideways and out of the trough areas.

Means are provided mounting each of the pivot means 21, 21' for independent essentially vertical adjustment for adjusting each of the gates 20, 20' between a raised, open position and a lowered, substantially closed position relative to the bottom wall means 13. By way of illustration, it will be observed in FIG. 2 that gate 20 is shown in a raised, partially open position and gate 20' is shown in a fully lowered, substantially closed position relative to bottom wall means 13. In either instance, it will be observed that an upper portion of each gate 20, 20' overlies the outer surface of the respective wall 11, 11' so as to reduce the pressure exerted on each gate 20, 20' by the feed in the bin or hopper. In this regard, it has been determined that, if the gates were not arranged in this overlapping relation to the feed hopper, the feed in the bin or hopper would readily cake up and not flow therefrom due to the pigs being unable to readily agitate the gates. Also, this overlapping of the gates relative to the side walls 11, 11' limits the inward extent of movement of the gates 20, 20'.

The pair of pivot means 21, 21' each comprises a respective pair of generally horizontally aligned pivot shafts 23 on which opposite ends of the upper portions of the respective gates 20, 20' are pivotally mounted. The pair of shafts 23 of each pivot means 21, 21' loosely penetrates and extends outwardly through a respective pair of apertures embodied in elongate slots provided in the end walls 12, 12', there being a pair of laterally spaced-apart inclined and downwardly converging elongate slots 24, 24' provided in each of the end walls 12, 12' and located outwardly of and adjacent the downwardly converging opposing side walls 11, 11'. It is apparent, therefore, that those inclined slots 24 in opposing end walls 12, 12' accommodate those pivot shafts 23 extending from opposite ends of gate 20, and those slots 24' in end walls 12, 12' accommodate those pivot shafts 23 extending from opposite ends of gate 20'.

Since all of the pivot shafts 23 may be adjustably supported in essentially the same manner, the supporting means for only one of the pivot shafts 23 will be described and the same reference characters shall apply to all of the pivot shaft supporting means. Accordingly, as best shown in FIG. 6, an elongate adjustable means is connected to each shaft 23 and extends upwardly therefrom and above the storage bin end walls 12, 12' (see FIGS. 1, 3 and 5) for effecting independent generally vertical adjustment of each end of each gate 20, 20'. To this end, the pivot shaft 23 shown in FIG. 6 has an elongate member or arm 30 extending upwardly from an outer portion of the respective pivot shaft 23 and positioned outwardly of the respective end wall 12, 12' of the feeder apparatus 10. As preferred, each pivot shaft 23 is integral with its respective elongate arm 30, it being best shown in FIG. 6 that the pivot shaft 23 and its arm 30 are illustrated in the form of a rod or bar, of circular cross section, which is bent at a right angle adjacent one end thereof to form the respective pivot shaft 23 extending inwardly at a right angle from the arm 30. Thus, each pivot shaft 23 and its arm 30 are in the form of an integral L-shaped rod of substantially circular cross section.

Each arm 30 extends upwardly substantially in alignment with the respective inclined slot 24 and slideably penetrates a respective pair of lower and upper bracket means 31, 32 suitably secured to the respective end wall 12, 12', thus guidingly engaging the respective elongate arm 30. The upper bracket means 32 is disposed adjacent the upper edge of the respective end wall 12, 12' and is loosely or slideably penetrated by a threaded upper end portion 33 of the respective elongate arm 30. Means is provided for threadedly engaging each of the elongate arms 30 for adjusting the same longitudinally relative to the respective bracket means 31, 32 and thus relative to the respective end wall of the feed bin to adjust each end of each gate 20, 20' relative to the respective side wall 11, 11'. Accordingly, it will be observed in FIGS. 1, 3 and 5 that the upper end of each upper bracket means 32 has a manually operable threaded means in the form of a wing nut 34 positioned thereagainst the threadedly mounted on the threaded upper portion 33 of the respective arm 30. Each wing nut 34 extends above the storage bin end walls 12, 12' so as to be readily accessible to an attendant for adjusting the gates 20, 20', even though there may be another or other animal feeders arranged in generally end-to-end relation to the instant feeder when in use. A lock nut 35 is also shown threaded onto a lower portion of the threaded portion 33 of the respective arm 30 for lockingly engaging the lower surface of the respective bracket means 32 when the wing nut 34 is adjusted on the threaded portion 33 of the respective arm 30 to position the corresponding end of the respective gate 20, 20' at the desired level relative to the bottom wall means 13 and the respective feed discharge opening 17, 17'.

As is well known, finely ground dry feed, especially of the type which may be fed to small pigs, for example, may become packed adjacent the feed escapement throat T and the feed discharge openings 17, 17' at times during the feeding of the pigs. However, since the upper end portions of the gates 20, 20' are pivotally suspended from the respective pairs of pivot shafts 23, the pigs may agitate the gates 20, 20' to aid the flow of feed through the respective feed discharge openings 17, 17'. In order to prevent the discharge of undesirably excessive amounts of feed through the discharge openings 17, 17' as a result of the agitation thereof by the pigs or other animals, guide means are provided for cooperating with each gate 20, 20' to permit only a predetermined limited swinging movement of the gates 20, 20' about their respective substantially horizontal axes irrespective of the positions of the gates between their fully opened and fully closed positions.

To this end, each end wall 12, 12' is provided with abutment means including a pair of laterally spaced inwardly projecting abutments 40, which may be in the form of lock nuts threaded onto respective screws penetrating the respective end walls 12, 12', as best shown in FIG. 6. The abutments 40 are so positioned that, throughout at least a major portion of the extent of substantially vertical adjustment of each gate 20, 20', opposite ends of the corresponding gate will be guided upon and in sliding engagement with the corresponding pair of abutments 40, it being noted that the two pivot shafts 23 shown in FIG. 2 are spaced further laterally apart or outwardly from each other than the two abutments 40 so that the gates 20, 20' tend to gravitate against the proximal surfaces of the abutments 40. Thus, the abutments 40 serve to limit the extent of outward pivotal movement of the gates 20, 20'. Further, since the upper portions of the gates 20, 20' are positioned above the lower extremities of the opposing side walls 11, 11', inward movement of the gates 20, 20' by the feeding animals or pigs is limited by engagement of the proximal surfaces of the gates 20, 20' with the outer or distal surfaces of the lower portions of the opposing downwardly converging side walls 11, 11'.

In order that the feeder apparatus 10 may be easily and economically manufactured while being of such strength as to withstand for a desirable length of time the rigors of hard use to which it may be subjected, it is preferred that the side walls 11, 11', end walls 12, 12', bottom wall means 13, gates 20, 20', and dividers 20a, 20a' are made from relatively thin sheet metal, with the side walls 11, 11' and the end walls 12, 12' being provided with inwardly facing reinforcing flanges 44 along the respective upper and opposite side edges thereof, and with the upper and lower edges of each gate 20, 20' and the opposite longitudinal side edges of the bottom wall means 13 each being rolled upon themselves to form reinforcing rolled edge portions 45 thereon. The lower edge of the end walls 12, 12' are also provided with inwardly facing flanges 44 thereon. By providing flanges 44 which face inwardly rather than outwardly, especially adjacent the lower portions of the opposing end walls 12, 12', there is less likelihood of the animals' waste lodging on the flanges and thus causing the lower portions of the end walls 12, 12' to rust away prematurely. It will be noted that the flanges 44 on opposite end side edges of the downwardly converging side walls 11, 11' conveniently serve to aid in securing the side walls 11, 11' to the proximal surfaces of the end walls 12, 12' as by means of bolts, rivets, or other suitable fastening means.

It is also to be noted that the upper rolled edge portion 45 on each gate 20, 20' not only serves to stabilize and reinforce the upper edge of each gate 20, 20', but it also serves to slideably receive the respective pivot shafts 23 for pivotally supporting opposite ends of each gate 20, 20' as heretofore described.

From the foregoing description, it can be seen that the substantially vertically adjustable elongate arms 30 and the pivot shafts 23 thereon provide for adjustment of each gate 20, 20' independently of the other as well as providing for adjustment of each end of each gate independently of the other, this being particularly desirable to avoid the circumstance of one end of a particular gate becoming bound against a corresponding end wall in such a manner that it cannot be otherwise adjusted unless the other end of the gate is separately or independently adjustable.

It should also be noted that, as indicated above, by mounting the gates 20, 20' so that they are pivoted above the lower edges of the feed bin or hopper side walls 11, 11', this tends to reduce the amount of pressure of the feed in the hopper or bin being transferred to the vertically adjustable gates 20, 20' as well as providing for increased leverage to permit the pigs or other animals to readily agitate the gates 20, 20' within the limits permitted by the relationship between the outer surfaces of the opposing side walls 11, 11' and the inner surfaces of the respective abutments 40. It will be noted that the dividers 20a, 20a' are quite large to aid in preventing the adjacent pigs or other animals from shifting the feed in the troughs defined by the opposite side portions of the bottom wall means 13 and finally rooting some of such feed out of the feeder apparatus, per se.

The positioning of the dividers 20a, 20a' on the respective gates 20, 20' is advantageous because it is relatively easier to weld such dividers to the gates than it is to weld the same troughs as is generally the case. There is also the functional advantage in that not only is each gate engaged by the snout of the pigs and thereby swung inwardly and outwardly to aid in movement of the feed from the feed hopper or bin into the feed trough as heretofore explained, but the dividers 20a, 20a' serve also for being engaged by the side of the nose or head of each pig to impart a slight longitudinal or sidewise movement to the respective gate to further aid in the movement of the feed from the feed bin or hopper into the corresponding trough.

Desirably, the sheet metal of which all the walls 11, 11', 12, 12', bottom wall means 13, gates 20, 20', and dividers 20a, 20a' are constructed is in the form of stainless steel although it has been found that galvanized sheet metal may be used.

In the drawings and specification there has been set forth a preferred embodiment of the invention, and although specific terms are employed, they are used in a generic and descriptive sense only, and not for purposes of limitation, the scope of the invention being defined in the claims.

That which is claimed is:

1. An animal feeder apparatus, especially for feeding pigs and the like, comprising a feed storage bin including opposing end walls and opposing downwardly converging side walls connected to and extending between said end walls and defining a feed escapement throat between lower portions thereof, and bottom wall means extending between said end walls and being spaced beneath said throat so as to define a feed discharge opening between the lower edge of each side wall and said bottom wall means, a pair of generally vertically disposed movable gates overlying the respective feed discharge openings for varying the size thereof, each of said opposing end walls having a pair of laterally spaced apertures therein positioned adjacent and outwardly of said converging side walls, means connected to opposite ends of each gate and extending outwardly through the respective apertures in said end walls for supporting the respective gate for pivotal movement about a substantially horizontal axis, and an elongate adjustable means connected to said means extending outwardly through said apertures and extending above each end wall for effecting generally vertical adjustment of said means extending outwardly through said apertures to vertically adjust each of said gates for thereby varying the rate of flow of the feed through said feed discharge openings, and wherein each of said elongate adjustable means comprises an elongate member extending alongside the respective bin end wall, guide means carried by said end walls for longitudinally guiding each elongate member, means adjustably engaging an upper portion of each elongate member and cooperating with said guide means for effecting longitudinal adjustment of said elongate member, and locking means cooperating with said elongate member for holding the same in the desired adjusted position.

2. An animal feeder apparatus according to claim 1 wherein said means connected to opposite ends of each gate comprises a respective pair of generally horizontally aligned pivot shafts loosely penetrating said apertures in said opposing end walls of said bin, each of said gates having a pair of opposing upper end portions mounting the gate on the respective pair of pivot shafts, and wherein each said elongate member comprises rod means connected to and extending upwardly from an outer portion of each respective pivot shaft and each having a threaded upper portion thereon, for cooperating with said adjustably engaging means for effecting longitudinal adjustment of said rod means for vertically adjusting each of said gates relative to the respective feed discharge opening.

3. An animal feeder apparatus, especially for feeding pigs and the like, comprising a feed storage bin including opposing end walls and opposing downwardly converging side walls connected to and extending between said end walls and defining a feed escapement throat between lower portions thereof, and bottom wall means extending between said end walls and being spaced beneath said throat so as to define a feed discharge opening between the lower edge of each side wall and said bottom wall means, a pair of generally vertically disposed movable gates overlying the respective feed discharge openings for varying the size thereof, each of said opposing end walls having a pair of laterally spaced apertures therein in the form of inclined and downwardly converging elongate slots positioned adjacent and outwardly of said converging side walls, means connected to opposite ends of each gate and extending outwardly through the respective inclined slots in side end walls for supporting the respective gate for pivotal movement about a substantially horizontal axis, and an elongate adjustable means connected to said means extending outwardly through said slots and extending upwardly therefrom for effecting generally vertical adjustment of said means extending outwardly through said slots for vertically adjusting each of said gates for thereby varying the rate of flow of the feed through said feed discharge openings, and wherein each of said elongate adjustable means comprises rod means extending alongside respective bin end walls and having a threaded upper end portion, guide means carried by said end walls for longitudinally guiding said rod means, means threadedly engaging the threaded upper end portion of said rod means and cooperating with said guide means for effecting longitudinal adjustment of said rod means, and locking means cooperating with said rod means for holding the same in the desired adjusted position.

* * * * *

UNITED STATES PATENT AND TRADEMARK OFFICE
CERTIFICATE OF CORRECTION

PATENT NO. : 4,306,518
DATED : December 22, 1981
INVENTOR(S) : William T. Herring It is certified that error appears in the above–identified patent and that said Letters Patent are hereby corrected as shown below:

Column 1, line 12, after "been" insert --of--.

Column 6, line 8, after "same" insert --to the--.

Column 8, Claim 3, line 11, "side" should be --said--.

Signed and Sealed this

Sixteenth Day of March 1982

|SEAL|

Attest:

Attesting Officer

GERALD J. MOSSINGHOFF

Commissioner of Patents and Trademarks